UNITED STATES PATENT OFFICE.

ANTONINO BUMMARA AND SALVATORE RAGONESI, OF NEW YORK, N. Y.

COATING COMPOSITION FOR IMITATING BARK OF TREES.

1,413,002. Specification of Letters Patent. Patented Apr. 18, 1922.

No Drawing. Application filed September 13, 1920. Serial No. 410,059.

*To all whom it may concern:*

Be it known that we, ANTONINO BUMMARA and SALVATORE RAGONESI, citizens of Italy, residing at 356 East 32nd St., New York, in the county of New York and State of New York, have invented certain new and useful Improvements in Coating Compositions for Imitating Bark of Trees; and we do declare the following to be a full, clear, and exact description of the invention, such as will enable others skilled in the art to which it appertains to make and use the same.

This invention relates generally to coating compositions and particularly to coating compositions for imitating the bark of trees.

The principal object of the invention is to provide a coating composition, which can be applied to surfaces in order to imitate tree bark.

The improved composition consists of shreds of paper, colored earth and clay, and a binding substance.

The particular ingredients of the composition are shreds of paper, glue, blue colored powdered earth, burnt umber, green colored clay, and yellow colored powdered earth.

In preparing the composition it is preferable to use the ingredients in the following proportions—viz., 16 ounces of shredded paper, 8 ounces of glue, 1 ounce of blue colored powdered earth, 2 ounces of burnt umber, 1 ounce of green colored clay, and 1 ounce of yellow colored powdered earth.

In preparing the composition the shreds of paper are thoroughly soaked in water. After this has been done the water is poured off and the moistened or wet shredded paper is mixed with the other ingredients and the whole mass is then thoroughly stirred or beaten until it becomes a paste.

The specific composition above described agrees in color with many kinds of tree bark, but its color may be changed to resemble other kinds of tree bark by the addition of suitable coloring matter.

In using the composition it is applied to the surface to be coated with the hands or in any convenient manner, and then a pointed, pronged or other suitable tool is used to form lines, marks or scores in the coating to resemble the lines, marks or scores of bark of trees. After this has been done, the coating is allowed to dry and set, thereby becoming hard and tough.

The composition may be used for refinishing woodwork and it may also be used to advantage by taxidermists, as it is of such a consistency that in preparing an artificial branch of a tree, various twigs and stems may be embedded into the composition and securely held by the same to the main branch.

Although the specified proportions of the ingredients are believed to be the best suited for the purpose described yet good results may be obtained by slightly varying these proportions, and it is to be understood that such may be done within the scope of the appended claims.

What is claimed is:

1. A composition of the class described consisting of 16 ounces of shredded paper, 8 ounces of glue, and 5 ounces of mixture of different kinds of powdered earth.

2. A coating composition consisting of 16 ounces of shredded paper, 8 ounces of glue, 1 ounce of blue colored powdered earth, 2 ounces of burnt umber, 1 ounce of green colored clay, and 1 ounce of yellow colored powdered earth.

In testimony whereof we have hereunto set our hands.

ANTONINO BUMMARA.
SALVATORE RAGONESI.